United States Patent [19]

Jokinen

[11] Patent Number: 5,396,657
[45] Date of Patent: Mar. 7, 1995

[54] SELECTABLE FILTER FOR REDUCING GAUSSIAN NOISE, CO-CHANNEL AND ADJACENT CHANNEL INTERFERENCE IN A RADIO-TELEPHONE RECEIVER

[75] Inventor: Harri A. Jokinen, Hiisi, Finland

[73] Assignee: Nokia Mobile Phones Ltd., Salo, Finland

[21] Appl. No.: 975,629

[22] Filed: Nov. 13, 1992

[30] Foreign Application Priority Data

Nov. 14, 1991 [FI] Finland .................. 915388

[51] Int. Cl.⁶ .................. H04B 1/10; G06F 15/31
[52] U.S. Cl. .................. 455/307; 455/339; 364/724.01; 327/553
[58] Field of Search .................. 455/63, 67.3, 295, 296, 455/306, 307, 339, 340; 307/520, 521, 543; 328/167; 375/11; 364/724.11, 724.19, 724.01

[56] References Cited

U.S. PATENT DOCUMENTS

| | | | |
|---|---|---|---|
| 2,923,814 | 2/1960 | Smith-Vaniz, Jr. | 455/307 |
| 4,038,539 | 7/1977 | Van Cleave | 328/167 |
| 4,322,641 | 3/1982 | Packard | 307/521 |
| 4,761,829 | 8/1988 | Lynk, Jr. et al. | 455/307 |
| 4,882,668 | 11/1989 | Schmid et al. | 364/600 |
| 4,907,293 | 3/1990 | Ueno | 455/295 |
| 4,910,799 | 3/1990 | Takayama | 455/306 |
| 5,148,548 | 9/1992 | Meche | 455/63 |
| 5,222,255 | 6/1993 | Kuo et al. | 455/296 |

FOREIGN PATENT DOCUMENTS

| | | | |
|---|---|---|---|
| 0453213A2 | 4/1991 | European Pat. Off. | |
| 0449199A2 | 10/1991 | European Pat. Off. | H04B 1/16 |
| 3721918 | 7/1987 | Germany | |
| 3618170A1 | 12/1987 | Germany | H04B 1/10 |
| 3836115A1 | 4/1990 | Germany | H04B 15/00 |
| 4000090A1 | 7/1991 | Germany | H04B 15/00 |
| 1579949 | 11/1980 | United Kingdom | H04B 15/00 |

OTHER PUBLICATIONS

Taub, Herbert, Principles of Communications Systems, 2nd Ed., 1986, pp. 315-321.

Primary Examiner—Edward F. Urban
Assistant Examiner—Mark D. Wisler
Attorney, Agent, or Firm—Perman & Green

[57] ABSTRACT

The invention relates to an adjustable filter comprising means for analysing the received signal which identifies the type of interference signal present from a predetermined set of interference signal types and an adaptive filter responsive to a control signal produced by the means for analysing the received signal dependent on the type of the interference signal detected.

8 Claims, 3 Drawing Sheets

SELECTABLE FILTER FOR REDUCING GAUSSIAN NOISE, CO-CHANNEL AND ADJACENT CHANNEL INTERFERENCE IN A RADIO-TELEPHONE RECEIVER

The invention relates to an adjustable filter means which is responsive to the type of interference signal received. The adjustable filter means is particularly but not exclusively applicable to digital mobile phone systems.

BACKGROUND OF THE INVENTION

The selectivity of the filter means in a cellular radio telephone is typically designed as a compromise regarding divergent filtering requirements. In digital phones filtering is performed by analog intermediate frequency filters and/or by baseband filters. The latter may also be realized in an SC-technique or with digital signal processing.

The most important divergent requirements when determining the appropriate filter requirements are attenuation of the adjacent channel, the required performance of the same channel, and sensitivity or the noise bandwidth. Signals comprising each of the above types of interference signal have different frequency responses. In individual cases the optimal filter response, on certain conditions, leads to a constant signal-to-noise distance over the whole signal band. Some optimum filter responses for different interference signals are presented below.

FIG. 1 shows a situation, where a signal 1 is received at the sensitivity level. Then the interference signal is white Gaussian noise 3. In this case the optimum filter is a so called matched filter 2 having a frequency response equal to the signal response. FIG. 2 shows a situation, where the signal 6 interfering with the received signal 4 consists of co-channel interference. In the case of digital networks this test is performed at a high signal level, whereby the importance of the noise is negligible. This also better corresponds to the actual situation in a network which is operated in the capacity limited region. The optimum filter 5 in this case has a flat frequency response in the signal band. FIG. 3 shows a situation where the signal 9 interfering with the received signal 7 is interference from an adjacent channel. In this case the suitable optimum filter response 8 is asymmetric relative to the center frequency.

In prior selectivity filters it was necessary to select a compromise filter having a response of a particular type, regardless of the interference type turning out to be significant in practice. Thereby the receiver performance considerably depends on the nature of the interference. Particularly interference on the adjacent channel and a situation at the sensitivity level results to poor performance with a fixed compromise filter compared to that with an adaptive filter.

An alternative filtering method comprised carrying out a complete spectral analysis of the received signal and matching an adjustable filter to the interference signal portion of the received signal exactly, as disclosed in U.S. 4882668. However, such a method requires considerable processor capacity.

SUMMARY OF THE INVENTION

In accordance with the present invention there is provided an adjustable filter means for selectively attenuating an interference signal, said interference signal being part of a received signal in a cellular radio telephone, the adjustable filter means comprising, means for analysing the received signal to determine the type of interference signal present therein from a predetermined set of interference signal types, means for generating a control signal indicative of one of said predetermined set of interference signal types so determined, and means for applying the received signal and the control signal to adaptive filtering means the frequency response of which is variable in response to said control signal to attenuate the interference signal.

BRIEF DESCRIPTION OF THE DRAWINGS

An advantage of the present invention is to provide better filtering and receiver performance than in prior equipment, and/or to provide enhanced receiver performance with a reduction in processor capacity requirements.

An embodiment of the invention is described below, by way of example, with reference to the accompanying drawings, in which.

DETAILED DESCRIPTION OF THE INVENTION

Figure 4:
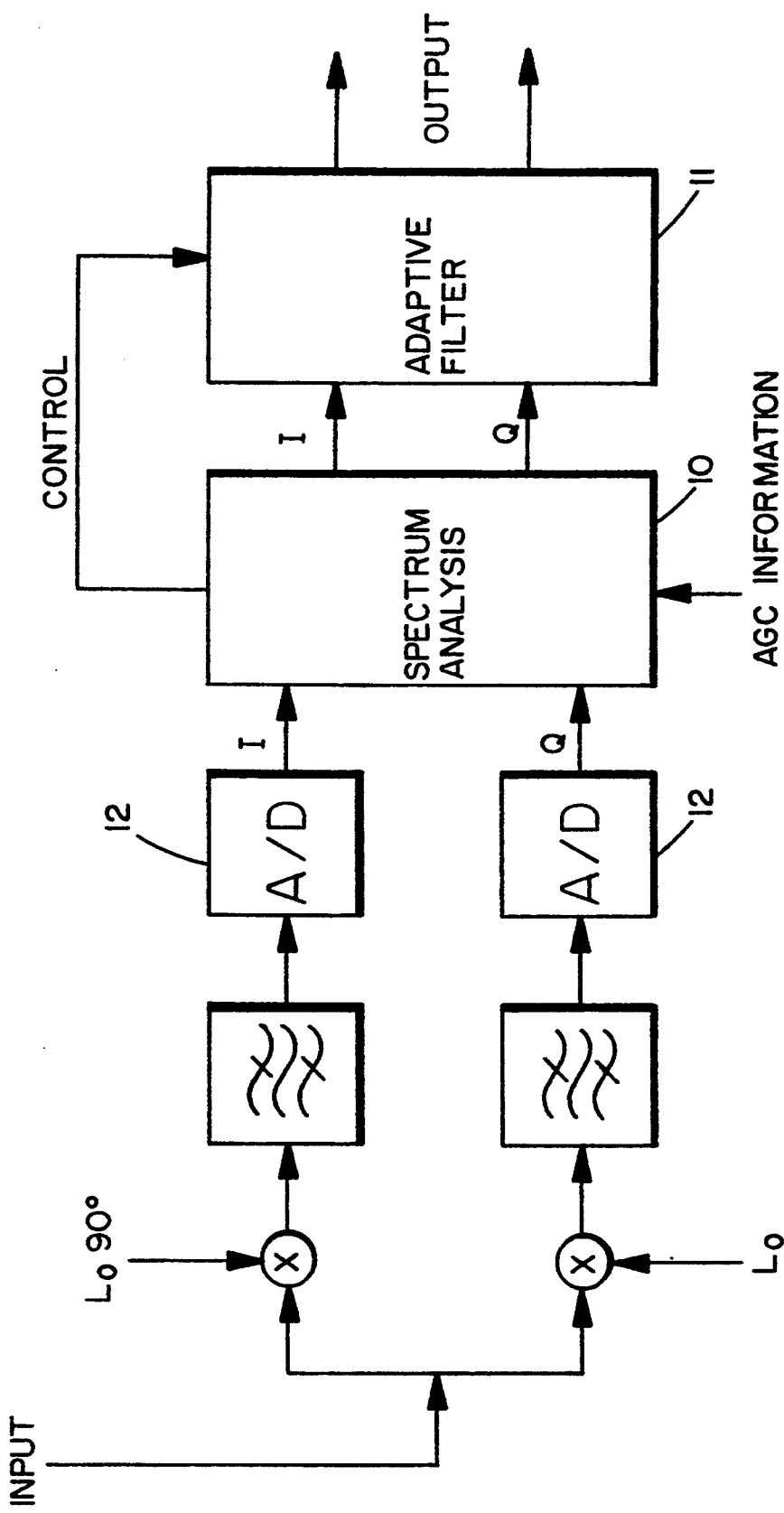
FIG. 4 illustrates a circuit diagram of an adjustable filter means in accordance with the present invention.

With reference to FIG. 4 the received digital signal is supplied in a known way into two branches, the so called I, Q branches. In one branch the signal is mixed with the local oscillator frequency $L_o$ and in the other branch with the frequency $L_o$ 90° having a 90 degrees phase shift relative to the frequency $L_o$.

Figure 1:
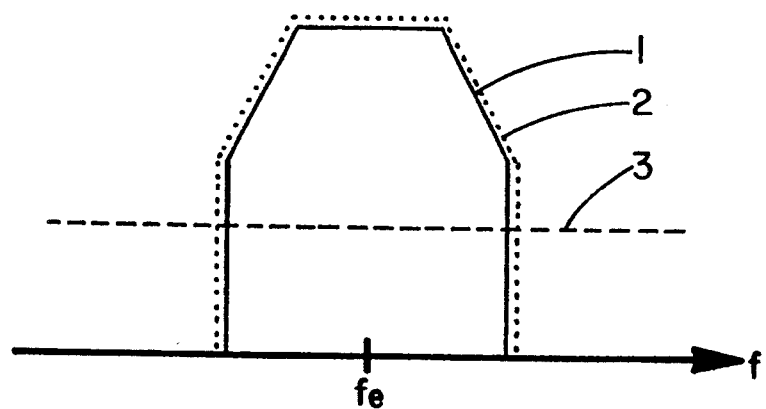
FIG. 1 is a schematic diagram illustrating an input signal comprising a white Gaussian noise interference.
Figure 2:
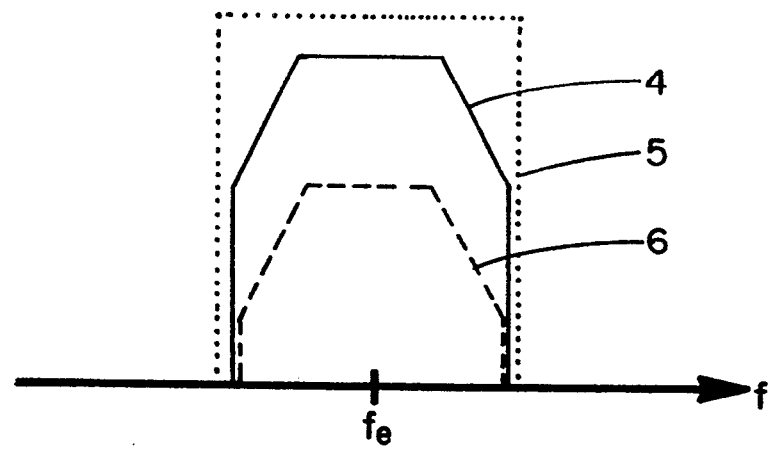
FIG. 2 is a schematic diagram illustrating an input signal comprising a same channel interference signal (co-channel interference)
Figure 3:
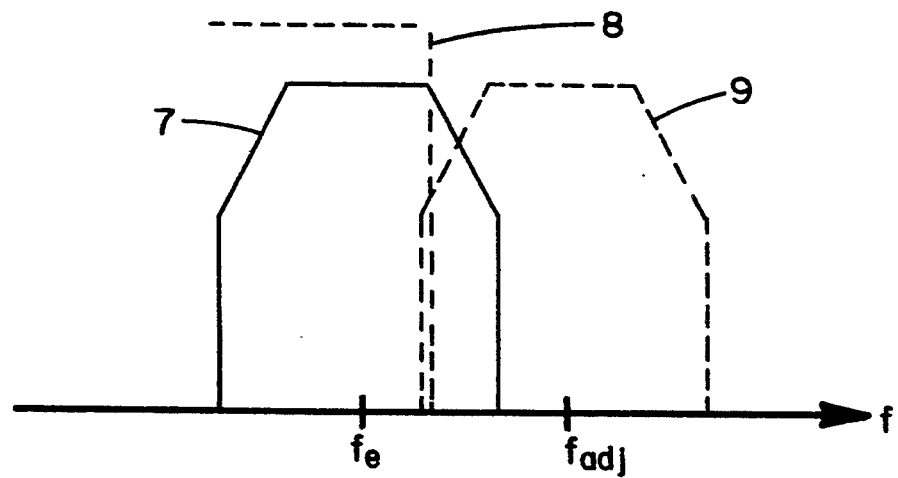
FIG. 3 is a schematic diagram illustrating an input signal comprising an adjacent channel interference.

The means for analysing the received signal 10 is realized by a spectrum analyzer, which identifies the type of interference signal present from a predetermined set of interference signal types illustrated in FIGS. 1 to 3. The I and Q signals are supplied to the filter 11, which is an adaptive filtering means which is responsive to the type of interference signal determined by the means for analysing the received signal 10. The means for analysing the received signal provides a control signal to the adaptive filter means 12 dependent on the type of interference signal detected and the adaptive filter means responds to provide the filter means required to filter out the interference signal.

When the measurement function is digital A/D-converters 12 are also required. The means for analysing the received signal 10 realizing the measurement function also receives information about the automatic gain control of the receiver, or the so called AGC information. This may be used to indicate that the receiver operates at sensitivity level.

Measurement of the interference spectrum in the means for analysing the received signal 10 can be realized by either digital signal processing or by narrow band analog filters (e.g. two filters). The narrow band analog filters can be combined with the actual integrated selectivity filter. The output of these narrow band analog filters together with carrier power information may be used to detect co-channel interference and adjacent channel interference conditions.

The adaptive filter means 11 can be a filter realized by digital signal processing (DSP) and controllable to a large degree, or a controlled analog filter. The filter may also be a filter selected among fixed parallel filters and suited for each of the set of predetermined interference types, as illustrated in FIGS. 1 to 3.

The performance of the receiver is greatly improved with the invention, and the advantage is particularly great considering the adjacent channel interference and in situations at the sensitivity level. The selectivity of the rf-parts can be decreased and tolerances increased, and the receiver noise performance could be decreased. This means cost savings and a lower current consumption.

Figure 5:
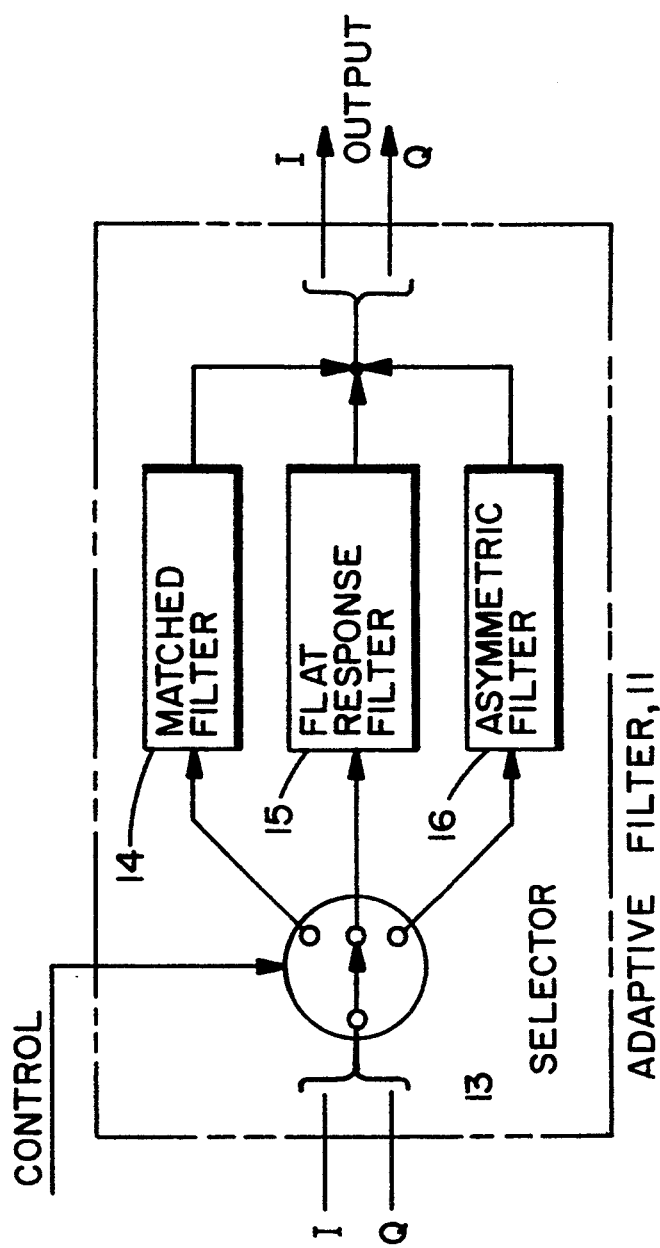
FIG. 5 shows diagrammatically circuitry of an embodiment of an adaptive filter of FIG. 4.

As shown in FIG. 5, one embodiment of the adaptive filter means 11 comprises a selector 13 (indicated diagrammatically as a switch) and three filters, namely, a matched filter 14, a flat response filter 15, and an asymmetric filter 16. These three filters 14, 15, and 16 provide respectively the filter function described above for FIGS. 1, 2, and 3. The I input signal and the Q input signal to the adaptive filter means 11 are applied selectively by the selector 13 to one of the filters 14, 15, and 16 for processing, after which the signals appear at the output of the adaptive filter means 11. The selector 13 is operated in response to the control signal from the means 10 for analyzing the received signal.

In view of the foregoing it will be clear to a person skilled in the art that modifications may be incorporated without departing from the scope of the present invention.

I claim:

1. An adjustable filter means for selectively attenuating an interference signal which is present with a desired signal, said interference signal and the desired signal constituting a received signal in a cellular radio telephone, the adjustable filter means comprising:
    means for analysing the received signal to determine the type of interference signal present therein from a predetermined set of interference signal types, said set of interference signal types including white Gaussian noise, co-channel interference, and adjacent channel interference;
    means for generating a control signal indicative of one of said predetermined set of interference signal types so determined;
    adaptive filter means, and means for applying the received signal and the control signal to said adaptive filter means, said adaptive filter means having a frequency response which is variable in response to said control signal to attenuate the interference signal;
    wherein said adaptive filter means has a plurality of filter functions drawn from a set of filter functions consisting of a filter matched to the spectrum of the desired signal, a flat-frequency response filter, and an asymmetric-response filter having a spectral passband which is asymmetric relative to a central frequency of the spectrum of the desired signal; and
    a variation in frequency response of said adaptive filter is obtained by a selection of one of said filter functions by the control signal.

2. An adjustable filter means as claimed in claim 1, wherein the adaptive filter means comprises a plurality of filter means providing said filter functions, wherein each of said filter means corresponds to one of said predetermined set of interference signal types.

3. An adjustable filter means as claimed in claim 1 wherein the adaptive filter means comprises a digital signal processor which controls a variable filter means.

4. An adjustable filter means as claimed in claim 1, wherein the adaptive filter means comprises a controlled variable analog filter.

5. An adjustable filter means as claimed in claim 1, wherein the means for analysing the received signal comprises a digital signal processor.

6. An adjustable filter means as claimed in claim 1, wherein the means for analysing the received signal comprises two narrow band analog filters.

7. An adjustable filter means for selectively attenuating an interference signal which is present with a desired signal, said interference signal and the desired signal constituting a received signal in a cellular radio telephone, the adjustable filter means comprising:
    means for analyzing the received signal to determine the type of interference signal present therein from a predetermined set of interference signal types, said set of interference signal types including white Gaussian noise, co-channel interference, and adjacent channel interference;
    means for generating a control signal indicative of one of said predetermined set of interference signal types so determined;
    adaptive filter means, and means for applying the received signal and the control signal to said adaptive filter means, said adaptive filter means having a frequency response which is variable in response to said control signal to attenuate the interference signal;
    wherein said adaptive filter means provides a plurality of filter functions, and the control signal selects the filter function;
    said adaptive filter means includes selector means, a filter matched to the spectrum of the desired signal, a flat-frequency response filter, and an asymmetric-response filter having a spectral passband which is asymmetric relative to a central frequency of the spectrum of the desired signal; and
    said selector means is responsive to said control signal to select said matched filter for said white Gaussian noise, to select said flat response filter for said co-channel interference, and to select said asymmetric filter for said adjacent channel interference.

8. An adjustable filter means for selectively attenuating an interference signal which is present with a desired signal, said interference signal and the desired signal constituting a received signal in a cellular radio telephone, the adjustable filter means comprising:
    means for analyzing the received signal to determine the type of interference signal present therein from a predetermined set of interference signal types, said set of interference signal types including white Gaussian noise, co-channel interference, and adjacent channel interference;
    means for generating a control signal indicative of one of said predetermined set of interference signal types so determined;
    adaptive filter means, and means for applying the received signal and the control signal to said adaptive filter means, said adaptive filter means having a frequency response which is variable in response to said control signal to attenuate the interference signal;

wherein said adaptive filter means provides a plurality of filter functions, and the control signal selects the filter function;

said adaptive filter means comprises a plurality of filter means providing said filter functions, wherein each of said filter means corresponds to one of said predetermined set of interference signal types;

said adaptive filter means includes selector means, a filter matched to the spectrum of the desired signal, a flat-frequency response filter, and an asymmetric-response filter having a spectral passband which is asymmetric relative to a central frequency of the spectrum of the desired signal; and said selector means is responsive to said control signal to select said matched filter for said white Gaussian noise, to select said flat response filter for said co-channel interference, and to select said asymmetric filter for said adjacent channel interference.

* * * * *